(12) United States Patent
Tracy et al.

(10) Patent No.: US 7,800,893 B2
(45) Date of Patent: Sep. 21, 2010

(54) DISPLAY STABILIZATION SYSTEM

(75) Inventors: Mark S. Tracy, Tomball, TX (US); Jonathan R. Harris, Cypress, TX (US); Paul J. Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 763 days.

(21) Appl. No.: 11/786,298

(22) Filed: Apr. 11, 2007

(65) Prior Publication Data

US 2008/0253072 A1  Oct. 16, 2008

(51) Int. Cl.
G06F 1/16 (2006.01)
H04M 1/00 (2006.01)
A47B 95/02 (2006.01)

(52) U.S. Cl. .............. 361/679.27; 361/679.26; 361/679.06; 361/679.07; 361/679.55; 455/575.1; 455/575.3; 248/921; 312/319.1

(58) Field of Classification Search ................. 361/679.01–679.45, 679.55–679.59; 455/575.1, 455/575.3; 248/917–924, 278.1; 345/156, 345/157, 168, 169, 905; 16/257, 277, 366–369; 312/223.1, 223.2, 319.1
See application file for complete search history.

(56) References Cited

U.S. PATENT DOCUMENTS

| 5,016,849 | A | 5/1991 | Wu |
| 5,206,790 | A | 4/1993 | Thomas et al. |
| 5,335,142 | A | 8/1994 | Anderson |
| 5,873,554 | A * | 2/1999 | Nobuchi .................. 248/278.1 |
| 6,275,376 | B1 | 8/2001 | Moon |
| 6,751,090 | B1 | 6/2004 | Yang |
| 6,798,646 | B2 | 9/2004 | Hsu |
| 6,867,961 | B2 | 3/2005 | Choi |
| 6,912,122 | B2 | 6/2005 | Chen |
| 7,027,297 | B1 | 4/2006 | Mizuno et al. |
| 7,133,280 | B2 | 11/2006 | Love |
| 7,515,405 | B2 * | 4/2009 | Lev et al. ............... 361/679.55 |
| 2003/0090862 | A1 | 5/2003 | Hsiang |
| 2004/0179330 | A1 | 9/2004 | Lee et al. |
| 2007/0290588 | A1 | 12/2007 | Oh |

FOREIGN PATENT DOCUMENTS

JP 2002-132382 5/2002
KR 10-2004-0057314 7/2004

* cited by examiner

*Primary Examiner*—Jayprakash N Gandhi
*Assistant Examiner*—Nidhi Desai

(57) ABSTRACT

A display stabilization system comprises an electronic device having a hinge assembly coupling a side of a display member to a base member to enable the display member to tilt and swivel relative to the base member and at least one stabilizer configured to cause a stabilization force to be applied between the base member and the side of the display member at a distal location relative to the hinge assembly.

20 Claims, 4 Drawing Sheets

DISPLAY STABILIZATION SYSTEM

BACKGROUND

Convertible computing/electronic devices (e.g., a notebook computer or cellular telephone) generally have a display member coupled to a base member using a multi-axial hinge or other element to enable the display member to tilt relative to the base member (e.g., for opening/closing the device) and swivel relative to the base member (e.g., to rotate the display member about an axis different than the tilting axis). However, because the display member is coupled to the base member at essentially a single, center-mount location, the display member is prone to "wobbling," which is especially prevalent in larger display members.

DETAILED DESCRIPTION OF THE DRAWINGS

Figure 1A:
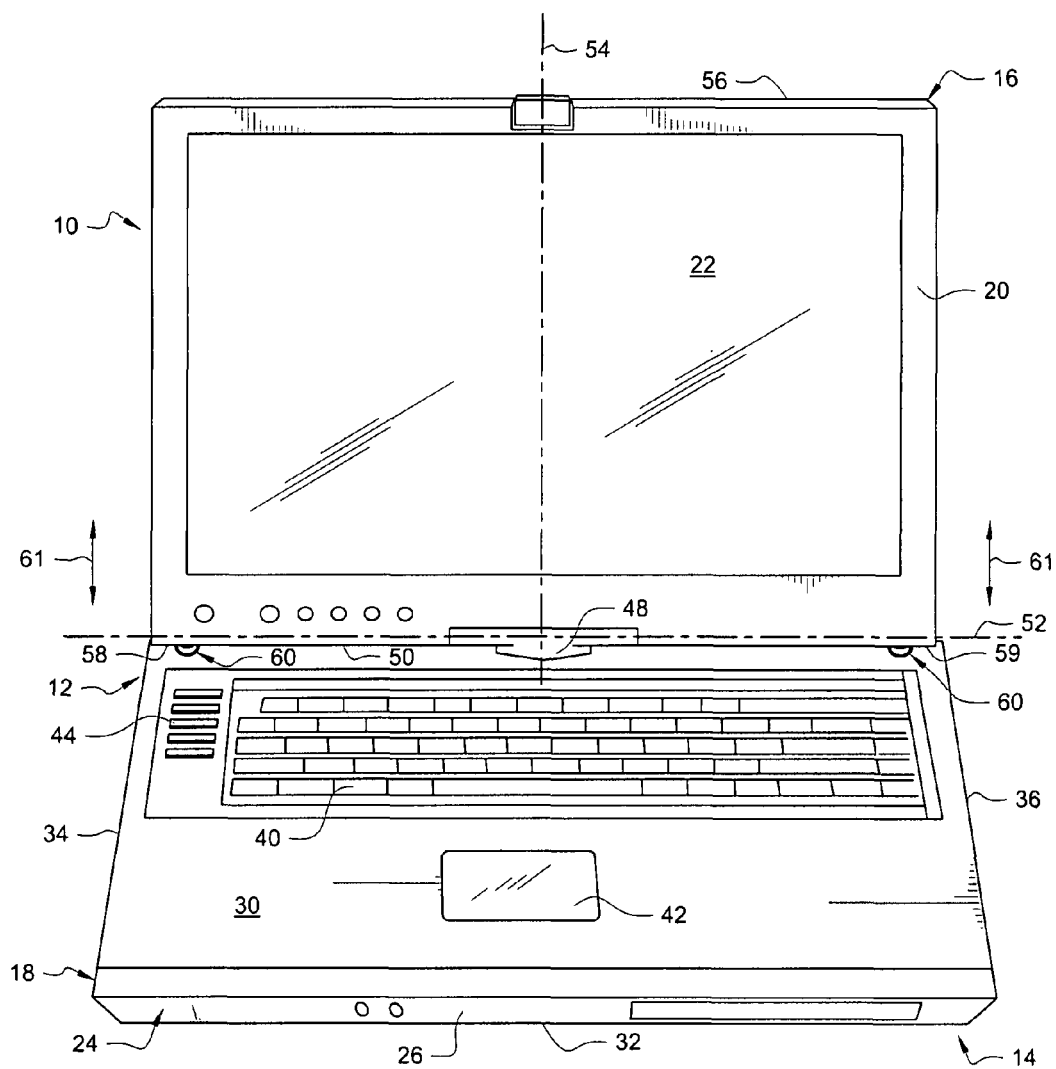
FIGS. 1A and 1B are diagrams illustrating an electronic device in which an embodiment of a display stabilization system is used to advantage.
Figure 1B:
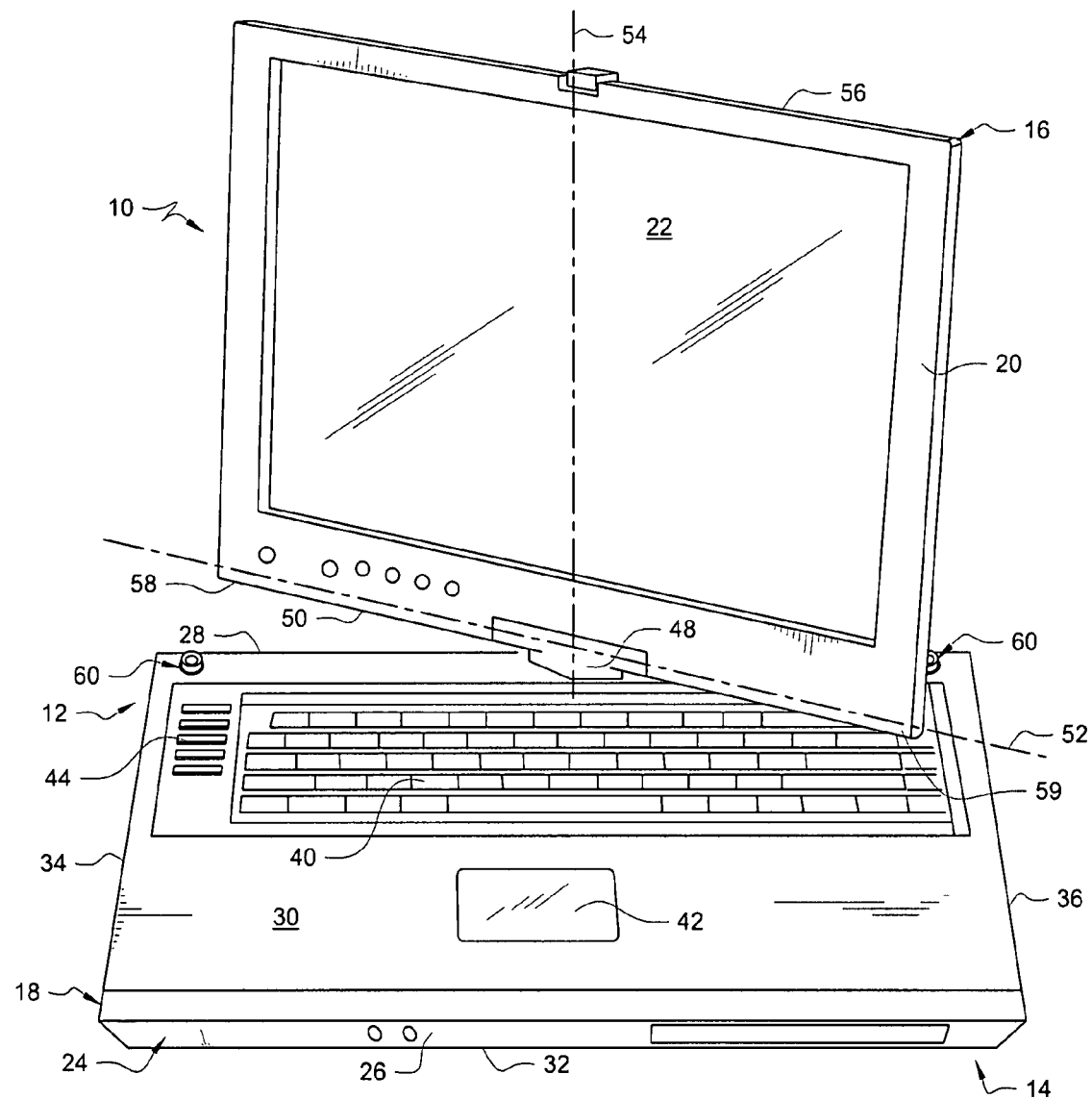

FIGS. 1A and 1B are diagrams illustrating an electronic device 10 in which a embodiment of a display stabilization system 12 is employed to advantage. In the embodiment illustrated in FIGS. 1A and 1B, electronic device 10 comprises a convertible notebook computer 14 having a display member 16 coupled to a base member 18 to enable tilting and swiveling/rotating of display member 16 relative to base member 18 (e.g., to facilitate use of notebook computer 14 in either a notebook mode or tablet mode). However, it should be understood that electronic device 10 may comprise any type of device having a display member coupled to a base member where the display member may be tilted and swiveled relative to the base member such as, but not limited to, a telephone, personal digital assistant (PDA) and a portable media device (e.g., a portable digital video disc (DVD) player). In FIGS. 1A and 1B, display member 16 comprises a housing 20 surrounding and/or otherwise supporting a display screen 22, and display member 18 comprises a housing 24 formed having a front wall 26, a rear wall 28, an upper wall defining and/or used as a working surface 30, a lower wall 32, and a pair of side walls 34 and 36. In the embodiment illustrated in FIGS. 1A and 1B, working surface 30 comprises a keyboard 40, a touch pad 42, and a plurality of function buttons 44. However, it should be understood that other and/or additional elements may be disposed on working surface 30 and/or elsewhere on electronic device 10.

In the embodiment illustrated in FIGS. 1A and 1B, electronic device 10 comprises a multi-axial hinge assembly 48 medially and/or centrally located along a side 50 of display member 16 to couple display member 16 to base member 18 to facilitate tilting and swiveling of display member 16 relative to base member 18. For example, in some embodiments, hinge assembly 48 couples side 50 of display member 16 to base member 18 to facilitate tilting of display member 16 about an axis 52 relative to base member 18 and rotation or swiveling of display member 16 about an axis 54 relative to base member 18 (e.g., in FIG. 1B, display member 16 is illustrated being slightly swiveled or rotated about axis 54 from its position illustrated in FIG. 1A). Thus, in operation, display member 16 is tiltable about axis 52 to enable display member 16 to be disposed adjacent to and/or in contact with working surface 30 (e.g., in a closed position where display screen 22 is disposed facing and/or adjacent to working surface 30 or a tablet mode where a side 56 of display member 16 opposite display screen 22 is disposed adjacent and/or in contact with working surface 30), and display member 16 is swivelable about axis 54 to enable display screen 22 of display member 16 to be directed or face in a variety of different directions. Thus, in the embodiment illustrated in FIGS. 1A and 1B, hinge assembly 48 provides a single, centrally-located mounting point for display member 16 relative to base member 18 to facilitate convertible use of electronic device 10 for various applications (e.g., to facilitate flexible locating/positioning/facing of display screen 22 relative to base member 18).

As best illustrated in FIG. 1B, display stabilization system 12 comprises a plurality of stabilizers 60 disposed in base member 18 and configured to stabilize display member 16 to substantially prevent or eliminate wobbling movement of display member 16 relative to base member 18 (e.g., when display member 16 is disposed in a particular position relative to base member 18 such as when side 50 of display member 16 is disposed in substantial alignment with and/or parallel to rear wall 28 where notebook computer 14 is an open notebook mode position). Thus, embodiments of system 12 substantially prevent and/or eliminate movement of ends 58 and 59 of side 50 of display member 16 up/down relative to base member, such as in the directions indicated by double-arrow 61 in FIG. 1A, that may otherwise result because of a single, center-mount hinge coupling display member 16 to base member 18. In FIGS. 1A and 1B, two stabilizers 60 are illustrated; however, it should be understood that a greater or fewer quantity of stabilizers 60 may be used. Further, in FIGS. 1A and 1B, stabilizers 60 are illustrated as being disposed in base member 18; however, it should be understood that stabilizers 60 may be disposed in display member 16, or a portion of stabilizers 60 may reside in base member 18 while another portion of stabilizers 60 resides in display member 16. In FIGS. 1A and 1B, stabilizers 60 are located at or near ends 58 and 59 of side 50 of display member 16. As used herein, the "end" 58 or 59 may comprise where side 50 terminates and/or slightly inwardly therefrom toward hinge assembly 48. Thus, as illustrated in FIGS. 1A and 1B, stabilizers 60 are distally located relative to hinge assembly 48 (or spaced apart from hinge assembly 48 by some desired distance) to substantially prevent or eliminate undesired wobbling movement of display member 16 relative to base member 18.

Figure 2A:
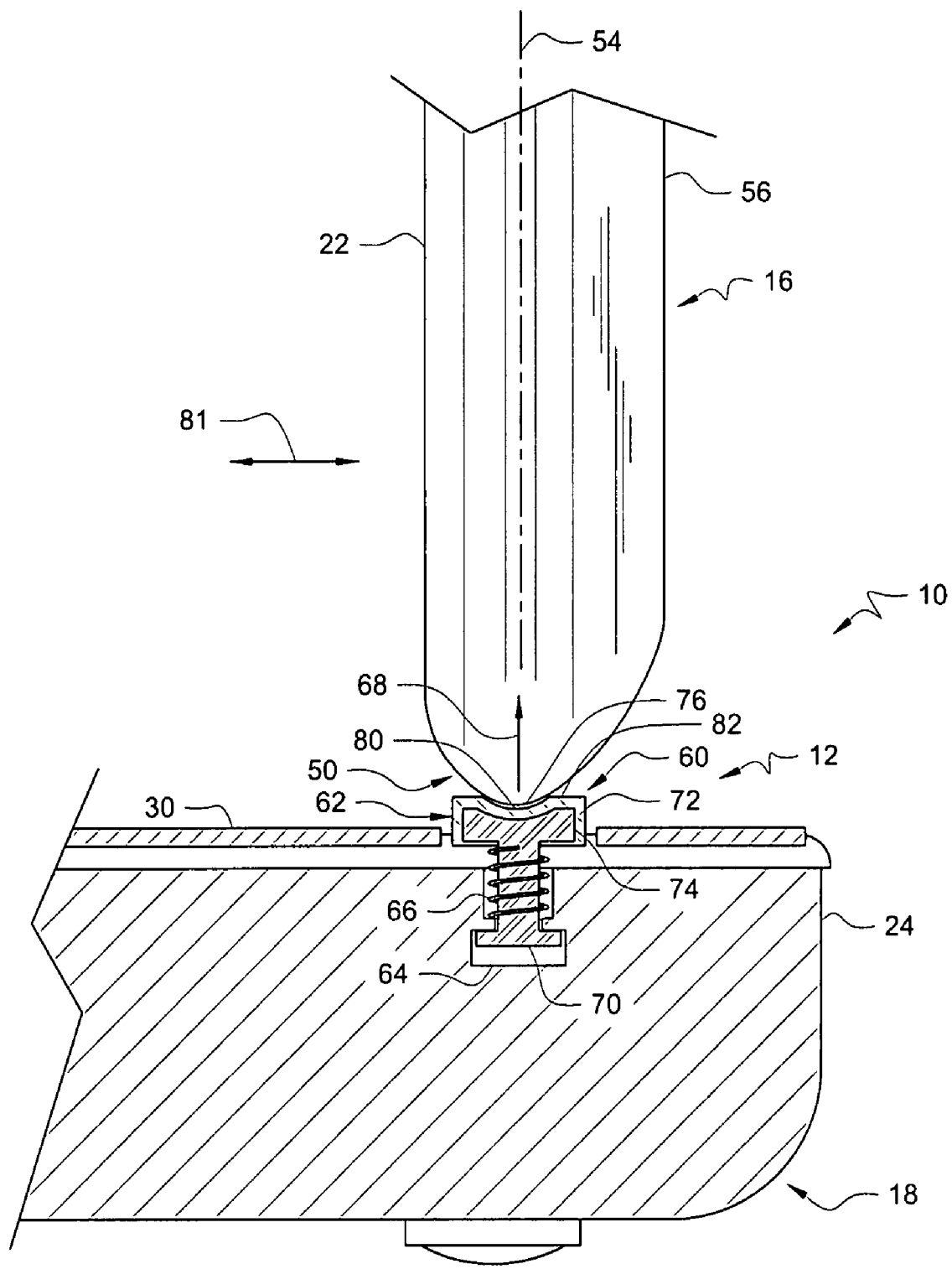
FIGS. 2A and 2B are diagrams illustrating a side section view of the electronic device and display stabilization system of FIG. 1.
Figure 2B:
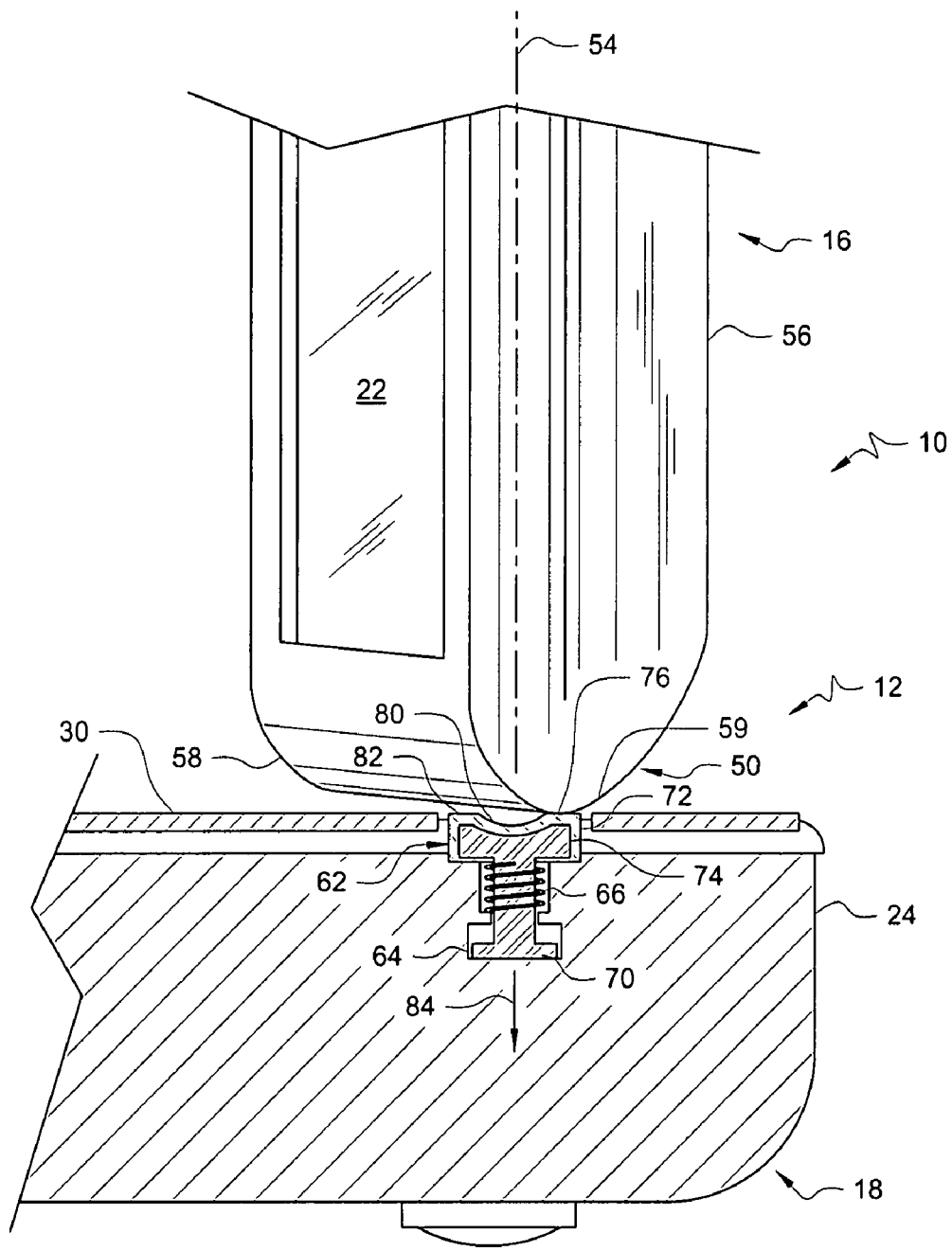

FIGS. 2A and 2B are diagrams illustrating a side view of electronic device 10 of FIGS. 1A and 1B partially in section. In the embodiment illustrated in FIGS. 2A and 2B, stabilizer 60 comprises a plunger 62 extending at least partially into a cavity 64 formed in base member 18 to facilitate extendable and retractable movement of plunger 62 relative to base member 18. For example, in the embodiment illustrated in FIGS. 2A and 2B, stabilizer 60 comprises a biasing element 66 configured to bias plunger 62 in a direction indicated by arrow 68 toward display member 16. Biasing element 66 may comprise a spring, flexible clip, or other type of device for biasing plunger 62 into an extended position relative to base member 18 to facilitate contact of plunger 62 with display member 16 when side 50 of display member 16 is disposed in alignment with a particular plunger 60 (e.g., when one of ends 58 and 59 (FIGS. 1A and 1B) are disposed near or across from a particular plunger 60).

In the embodiment illustrated in FIGS. 2A and 2B, plunger 62 comprises a rigid substrate 70 having a contact layer 72 disposed and/or otherwise bonded to a portion of substrate 70 that is configured to contact display member 16. Contact layer 72 may comprise an elastomer material such as, but not limited to, a thermoplastic elastomer, thermoplastic urethane, thermoplastic rubber or other material having at least somewhat flexible and or resilient properties that also will not scratch or otherwise damage display member 16. For example, as illustrated in FIGS. 2A and 2B, layer 72 is disposed and/or otherwise bonded to an upper cap portion 74 of substrate 70 such that layer 72 is in a position to contact side 50 of display member 16. As used herein, the "side" 50 of display member 16 may comprise an edge 76 of display member 16 and/or portions of display member 16 slightly forward and/or rearward of edge 76 (e.g., toward screen 22 and/or toward side 56). In some embodiments, an upper surface 80 of plunger 62 is formed having a shape complementary to a shape of side 50 of display member 16 to facilitate seating of side 50 of display member 16 in plunger 62. In some embodiments, plunger 60 is manufactured using an injection molding process such that contact layer 72 is overmolded onto substrate 70, thereby creating a chemical or cross-linked bond between the materials forming layer 72 and substrate 70. However, it should be understood that plunger 60 may be otherwise formed and/or configured.

Referring to FIG. 2A, plunger 62 is illustrated in at least a partially extended position relative to base member 18 and in contact with side 50 of display member 16, thereby applying a stabilization force to display member 16. In operation, biasing element 66 biases plunger 62 upwardly in the direction of arrow 68 toward display member 16 to enable the application of a stabilization force to side 50 of display member 16 to prevent wobbling movement of display member 16. Plunger(s) 62 also stabilizes display member 16 in directions indicated by double-arrow 81 (e.g., rotation of display member 16 about axis 54). For example, the stabilization force applied by plunger 62 to side 50 of display member 16, alone or in combination with the complementary and/or concave-shaped upper surface 80 of plunger, resists rotational movement of display member 16, thereby substantially preventing inadvertent rotation of display member 16 about axis 54.

Referring to FIG. 2B, display member 16 is illustrated in a slightly swiveled position about axis 54 relative to base member 18, and stabilizer 60 is illustrated in a slightly retracted position relative to base member 18. As illustrated in FIG. 2B, in response to swiveling or rotational movement of display member 16 about axis 54 (e.g., away from the position of display member 16 illustrated in FIG. 2A), edge 76 (or a portion of side 50 of display member 16 near edge 76) contacts a shoulder 82 of plunger 62, thereby causing plunger 62 to retract downwardly into base member 18 in a direction indicated by arrow 84 against the biasing force of biasing member 66 to enable rotation of display member 16 and movement of ends 58 and/or 59 away from stabilizer(s) 60. Further, in response to movement of ends 58 and/or 59 toward at least one of stabilizer 60 (e.g., in response to rotational movement of display member 16 about axis 54), edge 76 (or a portion of side 50 of display member 16 near edge 76) contacts shoulder 82 of plunger 62, thereby causing plunger 62 to retract downwardly into base member 18 in a direction indicated by arrow 84. Continued movement of display member 16 about axis 54 positions ends 58 and/or 59 in alignment with upper surface 80 of plunger 62, thereby enabling plunger 62 to extend from the retracted position to apply a stabilization force to side 50 of display member 16. Thus, in operation, plunger 62 is configured to extend and retract relative to base member 18 to facilitate swiveling movement of display member 16 relative to base member 18 while also enabling a stabilization force to be applied to display member 16 when display member 16 is located, for example, in an open notebook-type position (e.g., as indicated in FIGS. 1A and 2A).

What is claimed is:

1. An electronic device comprising: a hinge assembly coupling a side of a display member to a base member to enable the display member to tilt and swivel relative to the base member; and at least one stabilizer including a plunger that extends into a cavity in the base member and a biasing element that biases the plunger toward the display member, wherein the plunger extends outwardly from the cavity when the display member is in an open position to prevent the display member from wobbling and moves into the cavity as the display member swivels about the hinge assembly while in the open position; wherein the plunger includes a shoulder and the display member contacts the shoulder to move the plunger into the cavity so the display member can swivel about the hinge assembly.

2. The electronic device of claim 1, wherein the plunger has an outer contact layer that contacts the display member, the outer contact layer formed of an elastomer material.

3. The electronic device of claim 1, wherein the plunger includes an upper surface that has a shape complementary to a shape of a side of the display member to facilitate seating of the side of the display member onto the upper surface of the plunger.

4. The electronic device of claim 1, wherein the plunger has a concave-shaped upper surface that abuts against the display member and prevents inadvertent rotation of the display member.

5. The electronic device of claim 1, wherein the at least one stabilizer retracts into the cavity in response to movement of the display member relative to the base member.

6. An electronic device comprising: a base member and a display member, the display member having a side coupled to the base member to enable the display member to tilt and swivel relative to the base member; and a stabilizer with a plunger that moves both into and out from a cavity formed in the base member as the display member swivels while in an open position relative to the base member, wherein an end of the display member contacts the plunger and moves the plunger into the cavity as the display member swivels about a hinge relative to the base member; wherein the plunger includes a shoulder and the display member contacts the shoulder to move the plunger into the cavity so the display member can swivel about the hinge assembly.

7. The electronic device of claim 6, wherein the plunger is manufactured with an injection molding process such that an outer contact layer of the plunger is molded onto a substrate layer of the plunger to create a bond between the outer contact layer and the substrate layer.

8. The electronic device of claim 6, wherein the stabilizer further includes a biasing element that biases the plunger toward the display member to provide a stabilizing force that prevents the display member from swiveling.

9. The electronic device of claim 6, wherein the plunger includes an upper surface that has a shape complementary to a shape of a side of the display member to facilitate seating of the side of the display member onto the upper surface of the plunger.

10. The electronic device of claim 6, wherein the stabilizer retracts into the cavity in response to movement of the display member relative to the base member.

11. The electronic device of claim 6, wherein the plunger has an upper surface with the shoulder that abuts the display member to prevent inadvertent rotation of the display member.

12. An electronic device comprising: a hinge assembly coupling a base member to a side of a display member to enable the display member to tilt and swivel relative to the base member; and a stabilizer spaced apart from the hinge assembly and movable in a cavity formed in the base member between an extended position and a retracted position, wherein the stabilizer extends outwardly from the cavity while the display member is in an open position to prevent the display member from swiveling with respect to the base member, and the stabilizer retracts into the cavity in the retracted position as the display member swivels with respect to the base member; wherein the stabilizer includes a plunger that moves into and out of the cavity and a biasing element that biases an end of the plunger against an end of the display member to prevent the display member from rotating with respect to the base member; and wherein the plunger includes a shoulder and the display member contacts the shoulder to move the plunger into the cavity so the display member can swivel about the hinge assembly.

13. The electronic device of claim 12, wherein the plunger has a concave shape complementary to a shape of an end of the display member to receive the end of the display member.

14. The electronic device of claim 12, wherein the stabilizer retracts into the cavity in response to movement of the display member relative to the base member.

15. An electronic device comprising: a hinge assembly coupling a display member to a base member to enable the display member to tilt and swivel relative to the base member; and two stabilizers spaced apart with the hinge assembly located between the two stabilizers, each of the two stabilizers includes a plunger that moves into and out of a cavity formed in the base element, wherein the plunger is biased against the display member to prevent wobbling movement of the display member relative to the base member while the display member is in an open position; wherein the plunger includes a shoulder and the display member contacts the shoulder to move the plunger into the cavity so the display member can swivel about the hinge assembly.

16. The electronic device of claim 15, wherein each of the two stabilizers includes a biasing element located in the cavity to bias the plunger against the display member.

17. The electronic device of claim 15, wherein the plunger has an upper surface with a concave shape that receives an end of the display member and prevents rotation of the display member about the hinge assembly.

18. The electronic device of claim 15, wherein the plunger has an outer surface formed of an elastomer material that is bonded to a substrate of the plunger.

19. The electronic device of claim 15, wherein each of the stabilizers includes a spring formed around a body of the plunger, the spring biasing the plunger toward the display member.

20. The electronic device of claim 15, wherein an end of the plunger has a shape complementary to a shape of a side of the display member to facilitate seating of the side of the display member into the end of the plunger.

* * * * *

UNITED STATES PATENT AND TRADEMARK OFFICE
CERTIFICATE OF CORRECTION

| | | |
|---|---|---|
| PATENT NO. | : 7,800,893 B2 | |
| APPLICATION NO. | : 11/786298 | |
| DATED | : September 21, 2010 | |
| INVENTOR(S) | : Mark S. Tracy et al. | |

It is certified that error appears in the above-identified patent and that said Letters Patent is hereby corrected as shown below:

In column 4, line 4, in Claim 1, after "device" insert -- , --.

In column 4, line 34, in Claim 6, after "device" insert -- , --.

In column 5, line 1, in Claim 12, after "device" insert -- , --.

In column 5, line 26, in Claim 15, after "device" insert -- , --.

Signed and Sealed this
Third Day of May, 2011

David J. Kappos
*Director of the United States Patent and Trademark Office*